3,459,533
N-[HYDROCARBYLTHIOALKYL]HALOPHENOXY-
ACYLAMIDES AS HERBICIDES
William E. Weesner, Kettering, Ohio, assignor to Monsanto Research Corporation, St. Louis, Mo., a corporation of Delaware
No Drawing. Original application Jan. 3, 1966, Ser. No. 518,012. Divided and this application Nov. 28, 1967, Ser. No. 708,445
Int. Cl. A01n 9/12, 17/00
U.S. Cl. 71—98
4 Claims

ABSTRACT OF THE DISCLOSURE

Applicant of an N-(hydrocarbylthioalkyl)halophenoxyacylamide as a preemergent and contact herbicide.

This is a division of application Ser. No. 518,012, filed Jan. 3, 1966.

This invention relates to organic compounds of halogen and nitrogen, and more particularly provides a new and valuable class of hydrocarbylthioalkyl nitrogen-substituted halophenoxyacylamides, the method of preparing the same, and the use of these compounds as biological toxicants.

According to the invention, the N-(hydrocarbylthioalkyl)halophenoxyacylamides are prepared by the reaction of a halophenoxyacyl halide with a hydrocarbylthioalkylamine as shown in the following equation:

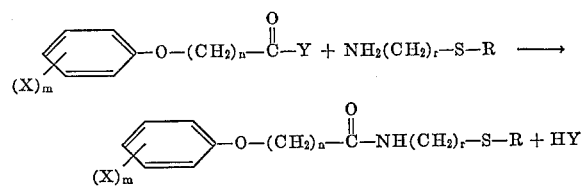

wherein X and Y are halogens having an atomic weight greater than 30, R is a hydrocarbyl radical which is free of olefinic and acetylenic unsaturation and contains from 1 to 8 carbon atoms, $m$ is an integer of from 1 to 5, $n$ is an integer of from 1 to 3, and $r$ is an integer of from 2 to 4.

Presently useful halophenoxyacyl halides are p-bromophenoxyacetyl chloride, o - chlorophenoxyacetyl iodide, n - chlorophenoxyacetyl bromide, 2,4 - dichlorophenoxyacetyl chloride, 2,4 - dibromophenoxyacetyl chloride, 2,4,5 - trichlorophenoxyacetyl chloride, 2,4,6 - trichlorophenoxyacetyl chloride, 2 - (2,4 - dichlorophenoxy)propionyl chloride, 2 - (2,4 - dichlorophenoxy)butyryl chloride, and 2 - (2,4,5,6 - tetraiodophenoxy)butyryl bromide. The preparation of a halophenoxyacyl chloride from a halophenoxyaliphatic acid and thionyl chloride is well known.

Presently useful hydrocarbylthiolakylamines are 2-(benzylthio)ethylamine, 2 - (butylthio)ethylamine, 1-ethylthio)ethylamine, 2-(methylthio)ethylamine, 2-(phenylthio)ethylamine, 2-(propylthio)ethylamine, 2-(p-tolylthio)ethylamine, 3 - (benzylthio)propylamine, 3 - (ethylthio) propylamine, 3 - ethylthio) - 3 - (phenyl)propylamine, 3-(methylthio)propylamine, 2 - (benzylthio)butylamine, 3-(benzylthio)butylamine, 3 - (benzylthio) - 3 - (methyl) butylamine, and 3-(cyclohexylthio)propylamine.

N - (hydrocarbylthioalkyl)halophenoxyacylamides provided by the invention are, for example:

N-[2-(butylthio)ethyl]-2-(p-bromophenoxy)acetamide,
N-[2-(ethylthio)ethyl]-(o-chlorophenoxy)acetamide,
N-[2-(phenylthio)ethyl]-(p-chlorophenoxy)acetamide,
N-[2-(benzylthio)ethyl]-2-(2,4-dichlorophenoxy) acetamide,
N-[2-(p-tolylthio)ethyl]-2-(2,4,5-trichlorophenoxy) acetamide,
N-[3-(benzylthio)propyl]-2-(2,4,-dichlorophenoxy) acetamide,
N-[3-(ethylthio)propyl]-2-(2,4-dichlorophenoxy) propionamide,
N-[3-(ethylthio)-3-(phenyl)propyl]-2-(2,4-dichlorophenoxy)butyramide,
N-[3-(benzylthio)butyl]-2-(o-chlorophenoxy)acetamide,
N-[3-(benzylthio)-3-(methyl)butyl]-2-(2,4,5,6-tetraiodophenoxy)butyramide, and
N-[3-(cyclohexylthio)propyl]-2-(2,4,-dibromophenoxy)acetamide.

Reaction of the halophenoxyacyl halide with a hydrocarbylthioalkylamine to give the presently provided N-(hydrocarbylthioalkyl)halophenoxyacylamides is conducted by simply mixing the two reactants in substantially equimolar proportions and stirring until formation of said halophenoxyacylamide is completed. Advantageously, in order to obtain smooth reaction and optimum yield of the product, the reaction is conducted in the presence of an inert organic liquid diluent or solvent which may be, e.g., an aliphatic or aromatic hydrocarbon such as hexane, benzene or xylene, a chlorinated hydrocarbon such as chloroform, carbon tetrachloride or chlorobenzene, etc.

The reaction is generally exothermic; hence, heating is usually not required and the reaction may be conducted by operating at ambient temperatures, or even with cooling. However, to shorten the reaction time for some of the somewhat sluggish acyl halides, heating may be used. Temperatures of from, say, 20° C. to 85° C. are thus useful.

Since the reaction occurs with liberation of hydrogen halide, it is conveniently effected in the presence of a basic agent which will serve as hydrogen halide scavenger by forming a solid hydrohalide. Conveniently, an excess of the hydrocarbylthioalkylamine may be used for this purpose. However, it may be any organic or inorganic base which does not react with the halophenoxyacyl halide in preference to said amine, e.g., an alkali metal hydroxide or a basic salt thereof such as sodium, potassium, lithium or rubidium hydroxide, carbonate or acetate; an alkali metal alkoxide such as sodium or potassium methoxide or propoxide; a tertiary alkylamine such as trimethylamine or tributylamine, a heterocyclic nitrogne base such as N-methylmorpholine or pyridine, a quaternary ammonium compound such as benzyltrimethylammonium methoxide or tetrabutylammonium butoxide, etc. An excess of the aromatic hydrocarbon amine is preferred.

Instead of using a hydrogen halide scavenger, or together with the scavenger, mechanical provision may be made for removal of the halide as it is formed, e.g., by means of vigorous stirring and/or dephegmation.

One mole of the halophenoxyacyl halide reacts with one mole of the said amine to give the present N-(hydrocarbylthioalkyl)halophenoxyacylamides; hence, the two reactants may be employed in such stoichiometric proportions. However, as above-stated, an excess of the aromatic hydrocarbon amine is conveniently used for the purpose of serving as scavenger for the by-product hydrogen halide. The resulting hydrohalide is readily removed from the reaction product by filtering or centrifuging, since it is insoluble in most organic solvents and in the reactants. Any excess of halophenoxyacyl halide or of the said amine may be separated by distillation or solvent extraction.

The N-(hydrocarbylthioalkyl)halophenoxyacylamidees are generally crystalline solids soluble in organic solvents such as ethanol, acetone, etc.

These novel compounds serve as preemergent and contact herbicides. For these purposes they can be dispersed as oil-in-water emulsions or mixed with inert fillers in a conventional manner, and the resulting herbicidal compositions are included within the scope of the invention. In the preparation of oil-in-water emulsions, ionic or nonionic wetting, dispersing or emulsifying agents are generally used, e.g., water-soluble salts of long-chain fatty acids; ethylene oxide condensates with fatty acids, alkyl phenols and mercaptans; sulfonates of high molecular weight organic compounds, etc. For the preparation of powders, these compounds may be combined with inert substances such as talc, clays, tricalcium phosphate, cork dust, etc. These compounds may be used alone, or in admixture with other active carriers and additives including fungicides, fumigants, bactericides, insecticides, fertilizers, hormones, or antibiotics.

In applying the herbicidal compounds, the concentration and amount of active compound needed for killing weeds without harming desirable plants are related to a number of factors including the species of plant, its stage of growth, weather factors at the time of application and immediately following, etc. Dosage adjustments may be made by varying the concentration and/or amounts of the herbicidal compositions employed, and may be determined by experimentation, as will be evident to one who is skilled in the art.

Other uses for these novel compounds are as microbiologicals, fungicides, plasticizers, and inhibitors.

The invention is further illustrated by, but not limited to, the following examples.

EXAMPLE 1

This example shows the preparation of N-[2-(benzylthio)ethyl]-2-(2,4-dichlorophenoxy)acetamide.

To a solution of 16.7 g. (0.1 mole) of 2-benzylthioethylamine and 10.1 g. (0.1 mole) of triethylamine in 150 ml. benzene was added slowly 24.0 g. (0.1 mole) of 2,4-dichlorophenoxyacetyl chloride. The mixture was stirred and cooled to maintain the temperature below 30° C. At the termination of the reaction, there was filtered off the theoretical quantity of triethylamine hydrochloride. Removal of the benzene from the filtrate yielded a solid. Recrystallization from methanol gave the product as needles, melting at 87.5–89° C., in 93% yield. It analyzed as follows:

*Analysis.*—For $C_{17}H_{17}Cl_2NO_2S$. Calcd. (percent): C, 55.14; H, 4.63; Cl, 19.15; N, 3.78; S, 8.66. Found (percent): C, 55.09; H, 4.70; Cl, 18.89; N, 3.77; S, 8.81.

prepared soil mixture and the pan leveled. The herbicidal composition was applied to the plantings prior to the watering of the seeds. This application of the herbicidal composition was made by spraying the surface of the soil with an acetone solution containing a sufficient quantity of the candidate chemical to obtain the desired rate per acre on the soil surface. The watering of the seeds was accomplished by placing the aluminum pans in a sand bench having one-half inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

0—No phytotoxicity
1—Slight phytotoxicity
2—Moderate phytotoxicity
3—Severe phytotoxicity The preemergent herbicidal activity of the compound of Example 1 is recorded in Table 1 for various application rates. In Table 1, the various seeds are represented by letters as follows:

| | |
|---|---|
| A—General grass | K—Foxtail |
| B—General broadleaf | L—Barnyard grass |
| C—Morning glory | M—Crab grass |
| D—Wild oat | N—Pigweed |
| E—Brome grass | O—Soybean |
| F—Rye grass | P—Wild buckwheat |
| G—Radish | Q—Tomato |
| H—Sugar beet | R—Sorghum |
| I—Cotton | S—Rice |
| J—Corn | |

General grass and general broadleaf were tested as described above except that random mixtures of grass seeds and of broadleaf seeds were used. Barnyard grass, cotton, corn and rice were similarly used in like tests.

TABLE 1

| Rate, lbs./acre | A | B | C | D | E | F | G | H | I | J | K | L | M | N | O | P | Q | R | S |
|---|---|---|---|---|---|---|---|---|---|---|---|---|---|---|---|---|---|---|---|
| 1 | 2 | 2 | 1 | 0 | 1 | 1 | 2 | 3 | | 3 | | 3 | 2 | 3 | 1 | 1 | 1 | | |
| 0.25 | 0 | 0 | 1 | 0 | 0 | 0 | 0 | 0 | 1 | 0 | 0 | 1 | 0 | 1 | 0 | 0 | 2 | 0 | 0 |
| 0.05 | 0 | 0 | 1 | 0 | 0 | 0 | 0 | 0 | 0 | 0 | 0 | 1 | 0 | 0 | 0 | 0 | 1 | 0 | 0 |

EXAMPLE 2

This example shows preemergent activity.

The preemergent herbicidal ratings of one of the compounds of the invention were determined in greenhouse tests in which a specific number of seeds of 12 different plants, each representing a principal botanical type, were planted in greenhouse flats. A good grade of top soil was placed in either 9½″ x 5¾″ x 2¾″ or 9″ x 13″ x 2″ aluminum pans and compacted to a depth of ⅜″ from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, wild oat; approximately 20 to 30 (a volume measure) of each of pigweed and crab grass; and either 2 or 3 seeds of soybean. The seeds were arranged with three soybean seeds across the center of the large aluminum pan, the monocotyledon or grass seeds scattered randomly over the remaining one-third of the soil surface, and the dicotyledon or broadleaf seeds scattered randomly over the remaining one-third of the soil surface at the other end of the pan. The seeds were then covered with ⅜″ of

EXAMPLE 3

This example shows activity as a contact herbicide.

The compound of Example 1 was applied in spray form to 21-day-old specimens of grasses and broadleaf plants. The plants were grown in 9½″ x 5¾″ x 2¾″ pans from five seeds of each of radish, morning glory and tomato; 10 seeds of each of sugar beet, sorghum and brome grass; 20 seeds of each of wild buckwheat, giant foxtail, rye grass, wild oat; approximately 20 to 30 of each of pigweed and crab grass; and two soybean seeds in diagonally opposite corners. After the plants were 21 days old, each pan was sprayed with 6 ml. of a 0.5% concentration solution of the candidate chemical, corresponding to a rate of approximately 9 lbs. per acre. This herbicidal solution was prepared from 1.5 ml. of a 2% solution of the candidate compound in acetone, 0.2 ml. of a cyclohexanone-emulsifying agent mix and sufficient water to make a volume of 6 ml. The emulsifying agent was a mixture comprising 35 weight percent butylamine dodecylbenzenesulfonate and 65 weight percent of a tall oil-ethylene oxide condensate having about 6 moles of ethylene oxide per mole of tall oil. Less concentrated solutions were prepared by dilution with water. The injuries to the plants at the indicated concentrations of the test compound were then observed 14 days later and are reported in Table 2. The herbicidal ratings are defined as follows: 0—no phytotoxicity; 1—slight phytotoxicity; 2—moderate phytotoxicity; 3—severe phytotoxicity; and 4—plant dead. The plant types are represented by letters as for Table 1.

an N-(hydrocarbylthioalkyl)halophenoxyacylamide of the formula

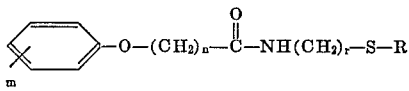

wherein X is halogen having an atomic weight greater

TABLE 2

| Conc. wt. | Plant type | | | | | | | | | | | | | | | | | |
|---|---|---|---|---|---|---|---|---|---|---|---|---|---|---|---|---|---|---|
| | A | B | C | D | E | F | G | H | I | J | K | L | M | N | O | P | Q | R | S |
| 0.5 | 0 | 4 | 4 | 1 | 1 | 1 | 4 | 4 | | | 0 | | 1 | 4 | 4 | 4 | 4 | 2 | |
| 0.05 | 0 | 2 | 3 | 0 | 0 | 0 | 2 | 3 | 3 | 0 | 0 | 0 | 0 | 4 | 3 | 2 | 4 | 0 | 0 |
| 0.01 | 0 | 1 | 1 | 0 | 0 | 0 | 1 | 3 | 2 | 0 | 0 | 0 | 0 | 1 | 1 | 0 | 1 | 0 | 0 |

It is to be understood that although the invention has been described with specific reference to particular embodiments thereof, it is not to be so limited since changes and alterations therein may be made which are within the full intended scope of this invention as defined by the appended claims.

What is claimed is:

1. The method of selectively inhibiting the germination of grass seeds in contact with soil and the preemergent growth thereof, which comprises treating the said soil with a herbicidal amount of an N-(hydrocarbylthioalkyl)halophenoxyacylamide of the formula

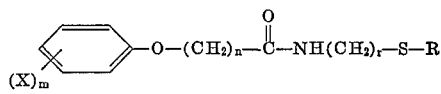

wherein X is halogen having an atomic weight greater than 30, R is benzyl, $m$ is an integer of from 1 to 4, $n$ is an integer of from 1 to 3, and $r$ is an integer of from 2 to 4.

2. The method of selectively inhibiting the germination of grass seeds in contact with soil and the preemergent growth thereof, which comprises treating the said soil with a herbicidal amount of an N-(hydrocarbylthioalkyl)halophenoxyacylamide of the formula

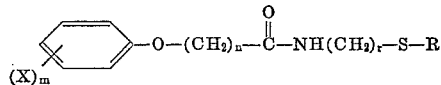

wherein X is chlorine, R is benzyl, $m=2$, $n=1$, and $r=2$.

3. The method of controlling vegetation which comprises applying to the foliage a phytotoxic amount of a composition containing as the essential active ingredient an N-(hydrocarbylthioalkyl)halophenoxyacylamide of the formula

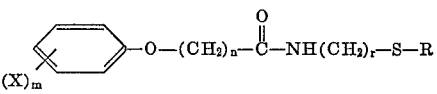

wherein X is halogen having an atomic weight greater than 30, R is benzyl, $m$ is an integer of from 1 to 4, $n$ is an integer of from 1 to 3, and $r$ is an integer of from 2 to 4.

4. The method of controlling vegetation which comprises applying to the foliage a phytotoxic amount of a composition containing as the essential active ingredient an N-(hydrocarbylthioalkyl)halophenoxyacylamide of the formula wherein X is chlorine, R is benzyl, $m=2$, $n=1$, and $r=2$.

References Cited

UNITED STATES PATENTS

| 2,577,969 | 12/1951 | Jones | 71—118 |
| 2,832,767 | 4/1958 | Boettner | 71—118 |
| 3,141,758 | 7/1964 | Hamm et al. | 71—98 |
| 3,142,554 | 7/1964 | Godfrey | 71—117 |
| 3,187,041 | 6/1965 | Richter | 71—118 |
| 3,282,939 | 11/1966 | Spivack et al. | 260—247.7 |
| 3,342,859 | 9/1967 | Dorfman et al. | 260—559 |

FOREIGN PATENTS

| 1,009,200 | 11/1965 | Great Britain. |

OTHER REFERENCES

Geigy, "Aryloxyacetamides" (1965), Belgium 659, 219, CA 64, pp. 2023–24 (1966).

LEWIS GOTTS, Primary Examiner

G. HOLLRAH, Assistant Examiner

U.S. Cl. X.R.

71—118; 260—999